US011353886B2

(12) United States Patent
Boyer et al.

(10) Patent No.: US 11,353,886 B2
(45) Date of Patent: Jun. 7, 2022

(54) AIRCRAFT DESCENT PHASE MANAGEMENT

(71) Applicant: THALES, Courbevoie (FR)

(72) Inventors: Johan Boyer, Toulouse (FR); Lucia Guerra Martin, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/940,777

(22) Filed: Mar. 29, 2018

(65) Prior Publication Data

US 2018/0284813 A1 Oct. 4, 2018

(30) Foreign Application Priority Data

Apr. 4, 2017 (FR) ..................................... 1700358

(51) Int. Cl.
*G05D 1/06* (2006.01)
*G08G 5/00* (2006.01)
(Continued)

(52) U.S. Cl.
CPC ........... *G05D 1/0676* (2013.01); *G01C 5/005* (2013.01); *G01C 23/005* (2013.01); *G05D 1/042* (2013.01);
(Continued)

(58) Field of Classification Search
CPC .... G01C 23/005; G01C 5/005; G08G 5/0069; G08G 5/0021; G08G 5/025; G08G 5/003;
(Continued)

(56) References Cited

U.S. PATENT DOCUMENTS 7,996,121 B2 * 8/2011 Ferro ..................... G01C 23/00
244/183
8,180,506 B2 * 5/2012 Sacle ................... G01C 23/005
244/183
(Continued)

FOREIGN PATENT DOCUMENTS

EP 2 955 673 A1 12/2015
FR 2 787 587 A1 6/2000
(Continued)

OTHER PUBLICATIONS

W. Glover, A Multi-Aireraft Model for Conflict Detection and Resolution Algorithm Evaluation, 2004, Hyrbridge D1.3 (Year: 2004).*
(Continued)

*Primary Examiner* — Fadey S. Jabr
*Assistant Examiner* — Mohamed Abdo Algehaim
(74) *Attorney, Agent, or Firm* — BakerHostetler (57) ABSTRACT

A method is described that is implemented by computer for optimizing the vertical descent profile of an aircraft, the vertical profile being broken down into an altitude profile and a speed profile. One or more altitudes of passage can be determined by minimizing the overall deviation between the speed profile and one or more speed constraints previously received. The optimized descent profile can comprise one or more of these altitudes of passage. Different developments are described, in particular embodiments in which an optimized altitude of passage minimizes the engine thrust, the descent profile is of OPEN IDLE, FPA or VS type, the optimized descent profile is determined backward, a speed constraint is of AT or AT OR ABOVE type, and the use of the airbrakes. Display modalities are described, as are system and software aspects.

9 Claims, 4 Drawing Sheets

(51) Int. Cl.
*G05D 1/04* (2006.01)
*G01C 5/00* (2006.01)
*G01C 23/00* (2006.01)
*G08G 5/02* (2006.01)

(52) U.S. Cl.
CPC ......... *G08G 5/0021* (2013.01); *G08G 5/0069* (2013.01); *G08G 5/025* (2013.01)

(58) Field of Classification Search
CPC .. G08G 5/0039; G08G 5/0034; G08G 5/0047; G08G 5/02; G05D 1/042; G05D 1/0676; G05D 1/101; G05D 1/04; G05D 1/044; G05D 1/046; G05D 1/0808; G05D 1/0069; G05D 1/06; G05D 1/0607; G05D 1/0653; B64D 43/02; B64C 29/00
USPC .......................................................... 701/16
See application file for complete search history.

(56) References Cited

U.S. PATENT DOCUMENTS

| | | | | |
|---|---|---|---|---|
| 8,924,137 | B2* | 12/2014 | Chan | G05D 1/104 701/120 |
| 8,954,262 | B2* | 2/2015 | Sawhill | G08G 5/0013 701/122 |
| 9,026,275 | B1* | 5/2015 | Young | G08G 5/0052 701/3 |
| 9,031,720 | B2* | 5/2015 | Accardo | G08G 5/0065 701/528 |
| 9,073,644 | B2* | 7/2015 | Le Gall | G08G 5/003 |
| 9,082,302 | B2* | 7/2015 | Dulac | G05D 1/0676 |
| 9,098,997 | B2* | 8/2015 | Stewart | G08G 5/003 |
| 9,135,828 | B2* | 9/2015 | Leones | G08G 5/003 |
| 9,142,135 | B2* | 9/2015 | Le Gall | G08G 5/02 |
| 9,330,574 | B1* | 5/2016 | Young | G08G 5/0052 |
| 9,378,645 | B2* | 6/2016 | Berrajaa | G01C 23/005 701/16 |
| 9,483,052 | B2* | 11/2016 | McGregor | G05D 1/0214 |
| 9,507,053 | B2* | 11/2016 | Navarro | G08G 5/025 701/16 |
| 9,536,435 | B1* | 1/2017 | Shay | G08G 5/0034 |
| 9,688,417 | B2* | 6/2017 | Labastie | G01C 23/00 244/183 |
| 9,963,247 | B2* | 5/2018 | Boyer | G08G 5/025 701/7 |
| 10,126,756 | B2* | 11/2018 | Boyer | G08G 5/0021 |
| 2008/0215196 | A1* | 9/2008 | Deker | G05D 1/0638 701/5 |
| 2009/0171519 | A1* | 7/2009 | Closse | G01C 23/005 701/16 |
| 2012/0053760 | A1* | 3/2012 | Burnside | G05D 1/0676 701/3 |
| 2013/0030611 | A1* | 1/2013 | Constans | G08G 5/025 701/7 |
| 2013/0218374 | A1* | 8/2013 | Lacko | G08G 5/025 701/16 |
| 2013/0221164 | A1* | 8/2013 | Klooster | G05D 1/0005 244/180 |
| 2014/0336932 | A1* | 11/2014 | Leones | G08G 5/003 701/528 |
| 2014/0343760 | A1* | 11/2014 | Le Gall | G08G 5/02 701/4 |
| 2014/0343764 | A1* | 11/2014 | Sacle | B64D 45/04 701/16 |
| 2014/0343766 | A1* | 11/2014 | Le Gall | B64D 45/04 701/18 |
| 2014/0358415 | A1* | 12/2014 | McDonald | G05D 1/101 701/120 |
| 2015/0120100 | A1* | 4/2015 | Sacle | G01C 21/20 701/18 |
| 2015/0149002 | A1* | 5/2015 | Berrajaa | G05D 1/0638 701/5 |
| 2015/0151849 | A1* | 6/2015 | Labastie | B64D 43/02 701/7 |
| 2016/0063867 | A1* | 3/2016 | Zammit | G08G 5/0039 701/18 |
| 2016/0085239 | A1* | 3/2016 | Boyer | G08G 5/0021 701/5 |
| 2017/0323573 | A1* | 11/2017 | Decker | G08G 5/0039 |
| 2018/0075761 | A1* | 3/2018 | De Villele | G08G 5/0021 |
| 2018/0134400 | A1* | 5/2018 | Knapp | B64D 27/24 |
| 2020/0192405 | A1* | 6/2020 | Mere | G08G 5/0021 |
| 2021/0103297 | A1* | 4/2021 | Fillingham | G08G 5/0034 |
| 2021/0217322 | A1* | 7/2021 | Mere | G08G 5/0021 |

FOREIGN PATENT DOCUMENTS

| | | | |
|---|---|---|---|
| FR | 3 005 760 | A1 | 11/2014 |
| FR | 3 014 213 | A1 | 6/2015 |
| FR | 3 026 177 | A1 | 3/2016 |

OTHER PUBLICATIONS

Angela Nuic, Enhancement in Realism of ATC Simulations by Improving Aircraft Behaviour Models, 2010, 29th Digital Avionics Systems Conference (Year: 2010).*

Angela Nuic, User Manual for the Base of Aircraft Data (BADA), 2010, Eurocontrol, Revision 3.10 (Year: 2010).*

Angela Nuic, BADA: An Advanced Aircraft Performance Model for Present and Future ATM Systems, 2010, Eurocontrol (Year: 2010).*

R. Alligier, Learning the Aircraft Mass and thrust to improve the ground-based Trajectory prediction of Climbing Flights, 2013, Transportation Research Part C (Year: 2013).*

Ramon Altava, Flight Management System Pathfinding Algorithm for Automatic Vertical Trajectory Generation, 2018, 37th Digital Avionics System (Year: 2018).*

Ramon Andreu Altava. Computation of Optimal Profiles in Descent and Approach Phases. Mathematical Software [cs.MS]. Universite Paul Sabatier—Toulouse III, 2020. English. ffNNT : 2020TOU30026ff. fftel-03004543f (Year: 2020).*

* cited by examiner

AIRCRAFT DESCENT PHASE MANAGEMENT

CROSS-REFERENCE TO RELATED APPLICATIONS

This application claims priority to foreign French patent application No. FR 1700358, filed on Apr. 4, 2017, the disclosure of which is incorporated by reference in its entirety.

FIELD OF THE INVENTION

The invention relates to the technical field of the methods and systems for managing the flight of an aircraft, and in particular for managing the descent phase.

BACKGROUND

According to the prior art, civilian airplanes determine their vertical descent profile from navigation databases, data input in the active flight plan and performance data of the airplane.

The vertical profile is established by the flight management system (F.M.S.), which computes the predictions associated with the performance levels of the aircraft making it possible to best comply with the operational constraints. The predicted vertical profile in descent and in approach is in particular computed so as to comply with all the altitude and/or speed constraints of the various points included in the flight plan.

The descent is divided into two parts, hereinafter called "geometrical" descent and "IDLE" descent.

The "IDLE" descent corresponds to a particular engine speed. An IDLE descent is associated with a reduced thrust of the engines. For example, at end of cruising, the pilot lets the airplane descend "naturally", by setting the engines to "IDLE" (or "IDLE thrust") until altitude and/or speed constraints are encountered which can modify a slope relative to the ground and/or can modify the speed, thus constraining the last degree of freedom available in piloting terms to be modulated, in this case the engine thrust. During the IDLE descent, the speeds are not constrained as a function of the altitude.

This type of reduced thrust (or minimum thrust in some cases, or modulo a margin or a tolerance) engine speed has in particular the advantage of descending to the landing runway by minimizing the nuisances (noise and pollution) and by minimizing the fuel consumption (operational costs). In other words, the aircraft remains at reduced thrust for as long as possible, between a descent start point and a point of exit beyond which the reduced thrust can no longer be held to comply with the constraints and allow the aircraft to land.

The point of the flight plan separating the two types of descent (geometrical and IDLE) is called the geometrical path point (G.P.P.). The G.P.P. point is the point of the flight plan separating the geometrical descent segment and the IDLE descent segment. It is generally determined by the first constraining altitude constraint. That means that, from the start of the descent to this point, the predictions of the descent are made at IDLE thrust and then the predictions are computed using slopes predicted to comply with the constraining altitude constraints.

Generally, the constraints in terms of altitude, slope, speed or time at the waypoints or of the flight plan can be expressed in various ways. The altitude constraints can be of "AT" (passage at the point at the given altitude), "AT OR ABOVE" (passage at or above the given altitude), "AT OR BELOW" (passage at or below the altitude) or "WINDOW" (passage between two altitudes) type. The speed constraints can be of the "AT" (passage at the point at the given speed), "AT OR ABOVE" (passage at or above the given speed) or "AT OR BELOW" (passage at or below the speed) type. The time constraints can be of the "AT" (passage at the point at the given time), "AT OR AFTER" (passage at or after the given time), "AT OR BEFORE" (passage at or before the given time) or "WINDOW" (passage between two times) type.

Few known approaches address the technical problem of managing speed constraints in a descent not-constrained in altitude (of IDLE type). In particular, in the existing systems in flight management system (FMS) terms, there is no provision to be able to hold to (or comply with or satisfy) any speed constraints (for example of "AT OR ABOVE" or of "AT" type which are constraining on the IDLE part, and are so both in geometrical descent and in approach maneuvering).

According to the known approaches, a fixed allocation between kinetic energy dissipation and potential energy dissipation is generally imposed by the aviator.

Some known computation methods provide for manipulating the allocation of the energy dissipation: these methods determine a speed profile which has to be followed or undergone thereafter, and which in particular is not necessarily suited to possible constraints existing on the descent speeds.

On the latter point, the patent document FR3014213 entitled "PROCEDE ET DISPOSITIF DE DETERMINATION AUTOMATIQUE D'UN PROFIL DE VITESSE A PALIERS DE VITESSE POUR UN AERONEF" ("Method and device for automatically determining a speed profile with speed levels for an aircraft") discloses a method consisting in maximizing the time spent at the optimal descent speed, including in the presence of speed constraints bracketing the optimum speed. Thus, the deceleration ("forward") to the optimum speed is immediate from a speed constraint of AT or AT OR ABOVE type greater than the optimum speed whereas the deceleration to a speed constraint of AT or AT OR BELOW type is delayed as long as possible so that the optimum descent speed is maintained for as long as possible. This document aims to reduce the operating costs, the optimum speed being the economic speed, obtained by the minimization of a cost criterion, favoring either the time, or the fuel consumption according to a parameter called Cost Index and input by the crew, generally according to instructions from the airline. This method presents limitations.

There is a need for methods and systems for improved management of the descent phase of an aircraft.

SUMMARY OF THE INVENTION

A method is described that is implemented by computer for optimizing the vertical descent profile of an aircraft, the vertical profile being broken down into an altitude profile and a speed profile. One or more altitudes of passage can be determined by minimizing the overall deviation between the speed profile and one or more speed constraints previously received. The optimized descent profile can comprise one or more of these altitudes of passage. Different developments are described, in particular embodiments in which an optimized altitude of passage minimizes the engine thrust, the descent profile is of OPEN IDLE, FPA or VS type, the optimized descent profile is determined backward, a speed constraint is of AT or AT OR ABOVE type, and the use of the airbrakes. Display modalities are described, as are system and software aspects.

Advantageously, the method according to the invention allows for a better energy management of the descent phase of an aircraft.

Advantageously, the method according to the invention makes it possible to adjust the allocation of energy dissipation between kinetic energy and potential energy (economically, because the fuel consumption is minimized): during a phase of the flight, the potential energy dissipation is unconstrained whereas the kinetic energy dissipation is constrained. This transfer of energy is in particular performed to satisfy all the descent speed constraints (whatever their natures).

Advantageously, in one embodiment, the method makes it possible to determine a flyable trajectory culminating in an energy stabilization of the airplane at 1000 ft, in landing configuration with the landing gear lowered.

In one embodiment, the method according to the invention comprises a step of determining, at a given instant, a slope suitable for complying with a predefined or received speed constraint, while minimizing the engine thrust.

In one embodiment, the invention comprises a step of converting a kinetic energy delta into a potential energy delta, thus converting a profile of OPEN IDLE type, that is to say with engine thrust reduced and fixed at the so-called "IDLE" speed, and with variable slope, into a geometrical profile with fixed slope approximating the thrust of IDLE type.

In one embodiment, the method according to the invention can be based on the computation of the predictions by the FMS and a computation step can consist in computing an optimal altitude profile in the descent phase of IDLE type to satisfy the constraining speed constraints while minimizing the thrust, that is to say the operational costs.

In one embodiment, the method according to the invention comprises a step of computing minimum and maximum reachable altitudes, and/or a computation of the optimum altitudes at each characteristic point of the IDLE descent exhibiting a speed constraint by taking account of all of the speed, altitude, slope and time constraints.

In one embodiment, this optimization is done using an estimator of the speed profile, which can be considered as a simplification of the "propagators" currently existing in the flight management system (FMS). The FMS contains a trajectory computation module which relies on a digital integration. This integration is performed from propagators which are used to propagate an airplane state from a given state to a desired state under given conditions. These propagators have different degrees of freedom, a propagator varying the speed will for example be able to consider either a fixed engine thrust and a variable slope, or a fixed slope and a variable engine thrust.

Advantageously, some embodiments of the invention make it possible to modify the altitude profile in IDLE descent, for each flight, i.e. according to particular features of procedures, of weather conditions, of speed, time, noise constraints and other parameters.

Advantageously, the invention manipulates flight procedures comprising speed constraints of AT, AT OR BELOW, AT OR ABOVE and WINDOW type, in particular in IDLE descent phase (not constrained in altitude).

Advantageously, the method according to the invention makes it possible to take account of the speed constraints on the part not constrained in altitude.

Advantageously, the speed profile determined according to the method of the invention is not "undergone" but it is on the contrary "adapted" (modified as a function of the speed constraints). The speed profile is not an unavoidable or imperative or mandatory datum. The speed profile can be adaptive, i.e. it can be adapted according to particular circumstances. In some embodiments, the speed profile is modified concurrently with a modification of the altitude profile.

Advantageously, contrary to the known methods using static (or invariant or fixed) energy criteria and/or rigid holding characteristics in terms of altitude and slope constraints, the performance levels of the airplane can be best exploited to guarantee the holding to the speed constraints, and do so maximizing the slope flown.

Advantageously, the method according to the invention makes it possible to comply with the "floating" speed constraints, i.e. speed constraints that are not supported by a constraining altitude constraint, and do so while guaranteeing optimum performance levels, that is to say a reduced operating cost.

Advantageously, the method according to the invention can be easily implemented, the implementation of the method according to the invention not requiring substantial modifications to the guidance function of the FMS or of the automatic pilot.

Advantageously, the method according to the invention can be implemented in a navigation device, which is for example embedded, managing the trajectory of an aircraft (a drone for example).

Advantageously, the method according to the invention can be implemented in a prediction device, such as that present in an FMS.

BRIEF DESCRIPTION OF THE DRAWINGS

Other features and advantages of the invention will become apparent from the following description and from the figures of the attached drawings in which.

DETAILED DESCRIPTION

Figure 1:
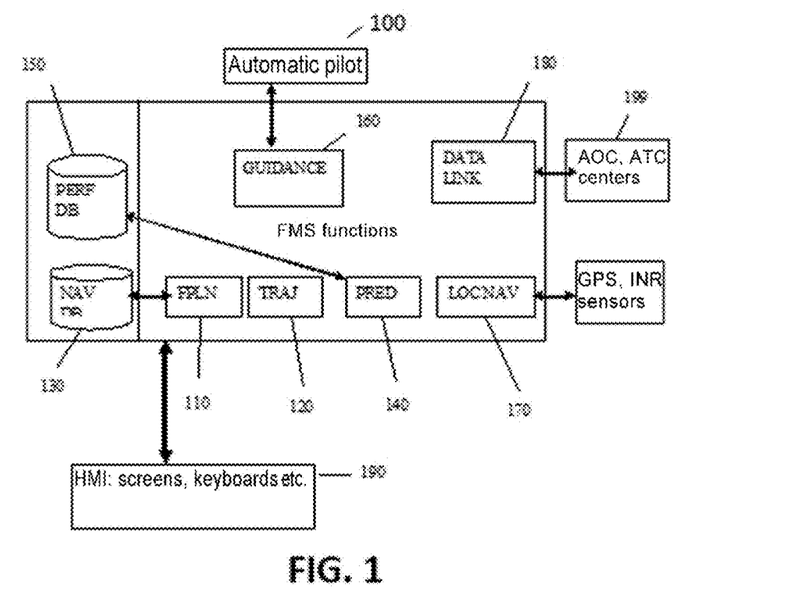
FIG. 1 schematically illustrates the structure and the functions of a known flight management system of F.M.S. type.

FIG. 1 schematically illustrates the structure and the functions of a known flight management system of F.M.S. type.

The F.M.S. 100 is generally connected to many other computers (a hundred or so), which can also implement one or more steps of the method according to the invention. The F.M.S. generally has different avionics functions, in particular for navigation LOCNAV 170, flight plan FPLN 110, navigation database NAVDB 130, performance database PERF DB 150, lateral trajectory TRAJ 120, predictions PRED 140, guidance GUID 160 and digital datalink DATALINK 180 for communicating with the control centers and the other aircraft. The F.M.S. comprises or can be associated with human-machine interfaces H.M.I. 190 (e.g. computer screens, augmented reality, virtual reality, haptic feedback, projectors, etc.). One or more systems (e.g. of non-avionics type) can access the avionics F.M.S., for example via the H.M.I.s 190 and/or by computers 199 of A.O.C. (airline) and/or A.T.C. (air traffic control) type.

Figure 2:
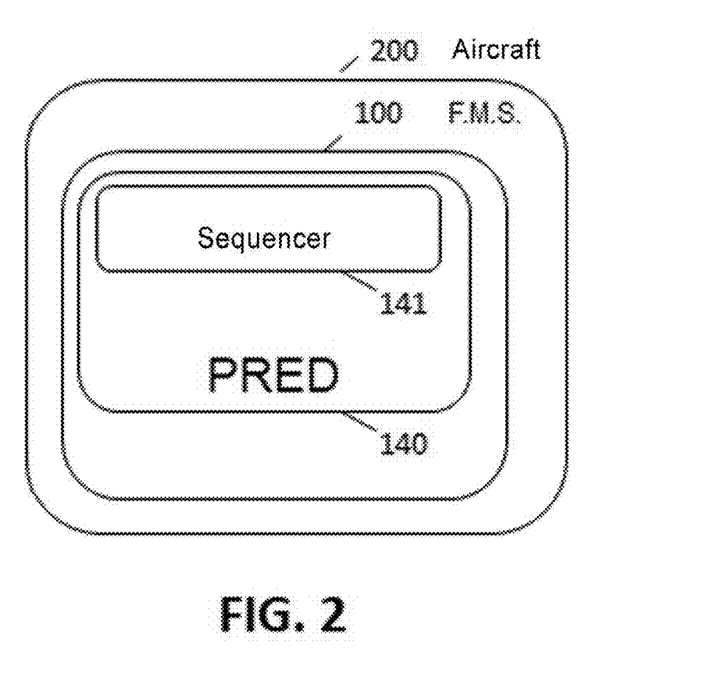
FIG. 2 illustrates system hardware aspects for the implementation of the invention.

FIG. 2 illustrates system hardware aspects for the implementation of the invention.

From a hardware point of view, the method can be implemented in or by a flight management system F.M.S 100 within the aircraft 200.

In one embodiment, a "state machine" (or "finite state machine") can be used as sequencer 141. In digital electronics, a finite state machine can be constructed as a programmable logic circuit, or as an industrial programmable state machine, with logic functions produced by flip-flops or relays. A hardware implementation generally comprises a register for storing the state variables, a combinatorial logic circuit which determines the state transitions, and a combinatorial logic block which determines the outputs of the state machine.

An avionics sequencer 141 assembles, according to predefined rules, different flight plan segments to construct the trajectory from an initial airplane state or from a predefined strategy linked to the different guidance modes of the aircraft.

The avionics sequencer 141 defines the sequence of segments to be used/flown according to a predefined strategy, i.e. logical rules governing the series or sequences of segments. The set of resulting segments constitutes the reference vertical trajectory to which the aircraft will be locked.

The segments can be of different types or categories. Four main types of segment (of flight plan) can be mentioned: 1) the "flight path angle" segments, of acronym F.P.A., which consist in fixing a ground slope (relative to the ground); 2) the "OPEN IDLE" segments consisting in fixing a reduced engine thrust; 3) the "vertical speed" segments, of acronym V.S., which consist in fixing a vertical speed; and 4) the "LEVEL" segments, which consist in fixing a level in altitude. Each of these four types of segment are subdivided into two categories: on the one hand, the acceleration (or deceleration) segments and, on the other hand, the segments at constant CAS or MACH speed. The conventional speed, or CAS (for "calibrated air speed"), is the indicated speed of an aircraft in relation to the mass of air at sea level, corrected of position and instrument errors. This speed makes it possible to best approach the speed equivalent from the pressure differential. A given CAS has a corresponding given effort on the aerodynamic control surfaces of the aircraft.

The state of the airplane is thus "propagated" by digital "integration" along a segment of given type until one or more of the exit conditions are reached, marking the end of the current segment, and the start of a new segment.

The exit conditions can in particular be defined by a speed, an altitude and/or a distance depending on the type of segment considered. For example, a LEVEL segment at constant speed can end only on a distance condition, whereas an F.P.A. segment at constant speed can end on an altitude or distance condition.

The final airplane state at end of segment constitutes the initial airplane state of the next segment, and is thus "propagated" until the final conditions of the computation are reached.

A method is disclosed that is implemented by computer for determining a vertical descent profile of an aircraft, comprising the steps of: —receiving one or more speed constraints and/or one or more altitude constraints; —determining a first altitude profile comprising a succession of altitude-related segments and a first speed profile comprising a succession of speed-related segments; —determining one or more deviations between the first altitude and/or speed profile on the one hand and said one or more altitude and/or speed constraints on the other hand; —determining one or more optimized altitudes of passage along said altitude profile, an optimized altitude of passage minimizing the deviation between the "resulting" or "corresponding" speed profile (that is to say that which is associated with the altitude profile comprising said one or more optimized altitudes) and said one or more received speed constraints; —determining an optimized descent profile comprising said one or more optimized altitudes of passage.

A (first) vertical descent profile can comprise a (first) altitude profile and a (first) speed profile. Each profile comprises a succession of segments. The altitude and speed segments correspond (see figures).

In one embodiment of the invention, constraints (e.g. speed, altitude, slope, etc.) are received, directly or indirectly (for example by the flight management system FMS). In one embodiment of the invention, a flight plan is received which comprises or involves these constraints. In other embodiments, the constraints are received directly. In other embodiments, the constraints are partly received and partly determined (or deduced). In one embodiment of the invention, a flight plan and/or a theoretical descent profile can be received which can comprise at least one speed constraint and/or at least one altitude constraint. In other words, the origin or the source of the constraints is not essential (although certain information can be derived therefrom, e.g. priority, confidence, requirements, etc.).

The constraints received/determined/manipulated by the invention can be speed and/or altitude constraints (that is to say exclusively speed constraints, or exclusively altitude constraints, or even an aggregation of speed and altitude constraints). The constraints can also be slope constraints. Other types of constraints can be manipulated by the invention (the above list is therefore non-exhaustive).

A constraint is generally associated with a point of the flight plan (e.g. a point of the descent profile). A constraint as manipulated by the invention therefore has a generally "local" connotation. In some cases, a constraint can be global and relate to several points of the flight plan.

In one embodiment, the method also comprises a step of disregarding and/or selecting one or more constraints, of speed and/or of altitude, out of the constraints received, as a function of priorities associated with said constraints.

In one embodiment of the invention, the constraints are treated with equality. In other embodiments, the different constraints are associated with different (or variable) priorities (or urgencies or demands or weightings). For example, the constraints that form part of the descent procedure (e.g. ATC, computed by the certified FMS) generally take priority over the optimized constraints determined by the method according to the invention.

In another example, for aeronautical safety reasons (in particular with respect to obstacles or air spaces), the altitude constraints can take precedence, i.e. can take priority over the speed constraints (which best make it possible to regulate the traffic flows). More generally, the different constraints manipulated/determined by the invention can be associated with priorities arranged hierarchically in a static (predefined) manner but also dynamically (for example as a function of the flight context or of external criteria, such as the fuel consumption, the noise of the aircraft, passenger comfort, etc.): weighting mechanisms between constraints can be implemented.

In one embodiment, the altitude constraints do not take priority over the speed constraints and vice versa.

In one embodiment, the altitude constraints can take priority over the speed constraints. A descent profile is constructed from downstream (the runway) to upstream (cruising level), in so-called "backward" mode, such that the altitude is always increasing.

In one embodiment, in the case where two altitude constraints are or become conflicting, the priority can be given to the highest (most severe) constraint, in the computation sense. Thus, an AT or AT OR ABOVE constraint for which the altitude is greater than that of an AT or AT OR BELOW constraint further away from the destination will be able to be considered as taking priority, for example causing the furthest away from the destination to be disregarded.

Conversely, in the case where two speed constraints are or become conflicting, the priority can be given to the lowest constraint. Thus an AT or AT OR BELOW constraint for which the speed is less than an AT or AT OR ABOVE constraint further away from the destination can lead to a non-compliance therewith if the deceleration performance levels of the airplane are not sufficient. Between two conflicting speed constraints of AT or AT OR BELOW type, that for which the value is the lowest will be able to take priority, and this for example independently of their distance to the destination.

In some embodiments, for example in some very specific situations, a speed constraint may take priority over an altitude constraint (this counter-intuitive example can be justified in light of a flight situation considered more globally), for example momentarily.

Generally, each constraint (of speed or of altitude) can be associated with one priority level out of several (which is for example configurable, generally static but sometimes dynamic, for example as a function of the flight context). Thus, different priorities can make it possible to hierarchically organize different constraints.

The method according to the invention determines particular constraints called "optimized" constraints or "intermediate" constraints or "target" constraints.

The optimization performed by the method according to the invention can be of different types. The optimization can be "combinatorial" (discrete optimization), consisting in finding in a discrete set one out of the best achievable subsets (or solutions), the notion of best solution being defined by (only) one objective function. The optimization can be also "multi-objective" (i.e. seek to simultaneously optimize several objectives of one and the same problem).

In one embodiment, the method can consist in minimizing the deviation (the difference) between K1 parameters (e.g. of speed, altitude, slope) associated with an optimized altitude and K2 constraints out of the N constraints received. The objective function to be optimized can be generalized (in the preceding example, it consists in minimizing a deviation, but it can also involve maximizing a function, for example of analytical, nonlinear, or other such expression).

The determination of the optimized altitudes make it possible to define one or more descent profiles (a subselection of the plurality of the optimized altitudes can be performed, which can lead to several types of descent).

In one embodiment, an optimized altitude of passage also minimizes the engine(s) thrust.

In one embodiment, the optimization according to the method can in fact consist in positioning an optimized altitude of passage that is "the highest possible", by guaranteeing that the performance levels of the airplane will make it possible to hold to the speed constraint, for the thrust to be minimal.

By construction, the engine thrust will be minimized, between the point of the flight plan (or of the descent profile) and the point of arrival of the aircraft.

In one embodiment, the optimized descent profile is of OPEN IDLE type or of FPA type or of VS type.

In an OPEN IDLE descent, the slope is not fixed, it is variable. In a descent of FPA (flight path angle) type, the slope is fixed relative to the ground. In a descent of VS type, the aircraft flies at constant vertical speed. In one embodiment, the descent profile can be of FPA-0 type.

The effect of a minimized or reduced engine thrust is to minimize the fuel consumption.

In one embodiment, the optimized descent profile, comprising one or more optimized altitudes, is determined backward.

The descent profile can be determined iteratively, i.e. by successive approximations.

The iterative dimension is linked to the iterative convergence making it possible to comply with the speed constraints.

From the optimized altitude of passage according to the speed constraints received (OBJECT 1), modified optimized altitudes of passage (OBJECT 2, 3, 4, etc.) are iteratively determined which minimize two factors optionally cumulatively (compliance with the speed constraints first of all, minimization of the engine speed next). Minimizing the deviation in terms of speed to the speed constraint advantageously makes it possible to minimize the engine thrust.

In one embodiment, the optimized descent profile determined backward is determined from downstream to upstream, or from the point of arrival or of destination of the flight plan of the aircraft to the current flight plan point or the point associated with the flight plan point associated with the optimized altitude.

A backward profile is computed, that is to say (for example) from the runway to the cruising phase. The iterative dimension is linked to the iterative convergence making it possible to comply with the speed constraints.

In one embodiment, a speed constraint is of AT or AT OR ABOVE type.

In one embodiment, the particular speed constraints that are the speed constrains of AT and AT OR ABOVE type (on the IDLE part) are taken into account.

In one embodiment, prior to the taking into account of the speed constraint of AT or AT OR ABOVE type, the capacity of the aircraft to comply with one or more speed constraints of AT, AT OR BELOW, or AT OR ABOVE type during the descent is evaluated according to the vertical descent profile determined. The satisfaction of one or more of these constraints can be determined.

In one embodiment, the step of iteratively determining the optimized vertical descent profile comprises a step of converting kinetic energy into potential energy so as to convert a so-called OPEN IDLE vertical descent profile into a geometrical profile with fixed slope approximating the IDLE reduced thrust.

In one embodiment, the method also comprises the step of requesting actuation of and/or actuating the airbrakes of the aircraft to reduce the speed of the aircraft by retaining a reduced engine thrust of IDLE type.

The use of the airbrakes can be visible, for example through a dedicated message prompting the pilot to actuate them. In some embodiments, the leading-edge slats and foil flaps can be actuated. In another embodiment, the landing gear can be used.

In one embodiment, the number of iterations for the determination of the backward optimized vertical descent profile is configurable.

According to the embodiments, the number of iterations performed by the method can be followed and can be bracketed by one or more thresholds; for example, a minimum number of iterations can be required (for the accuracy of the computation), as can a maximum number of iterations or of computations (the computations must in practice converge).

In one embodiment, the method also comprises a step of displaying at least one optimized altitude of passage.

An optimized altitude, after determination, may or may not be displayed to the pilot.

If it is not displayed, an optimized altitude can be taken directly into account in the descent profile computations (closed loop).

On the other hand, if necessary, an optimized altitude can be displayed to the pilot, who can possibly confirm or deny or modify this optimized altitude.

In one embodiment, an optimized altitude can be displayed on the ND and/or on the VD and/or on the MCDU and/or on the FMD. The display can take place in the cockpit, on one (or more) screen(s) of the cockpit (ND/VD/FMD) and/or on a tablet.

In variant embodiments, missed altitudes of passage can be detected, indicated or monitored.

A computer program product is disclosed, said computer program comprising code instructions making it possible to perform one or more of the steps of the method, when said program is run on a computer.

A system is disclosed for implementing one or more of the steps of the method.

In one embodiment, the system comprises an avionics sequencer configured to iteratively determine a vertical descent profile.

A sequencer is a state machine (for example a finite state machine) which is characterized by a predefined logic.

In one embodiment, the system comprises a flight management system of avionics type F.M.S. and/or an electronic flight bag E.F.B.

An electronic flight bag is an EFB. More generally, a computer tablet can be used (or a removable or portable screen situated in the cockpit). Other systems can implement all or part of the invention: avionics systems such as systems on the ground, ATC systems, remote drone piloting equipment.

Figure 3:
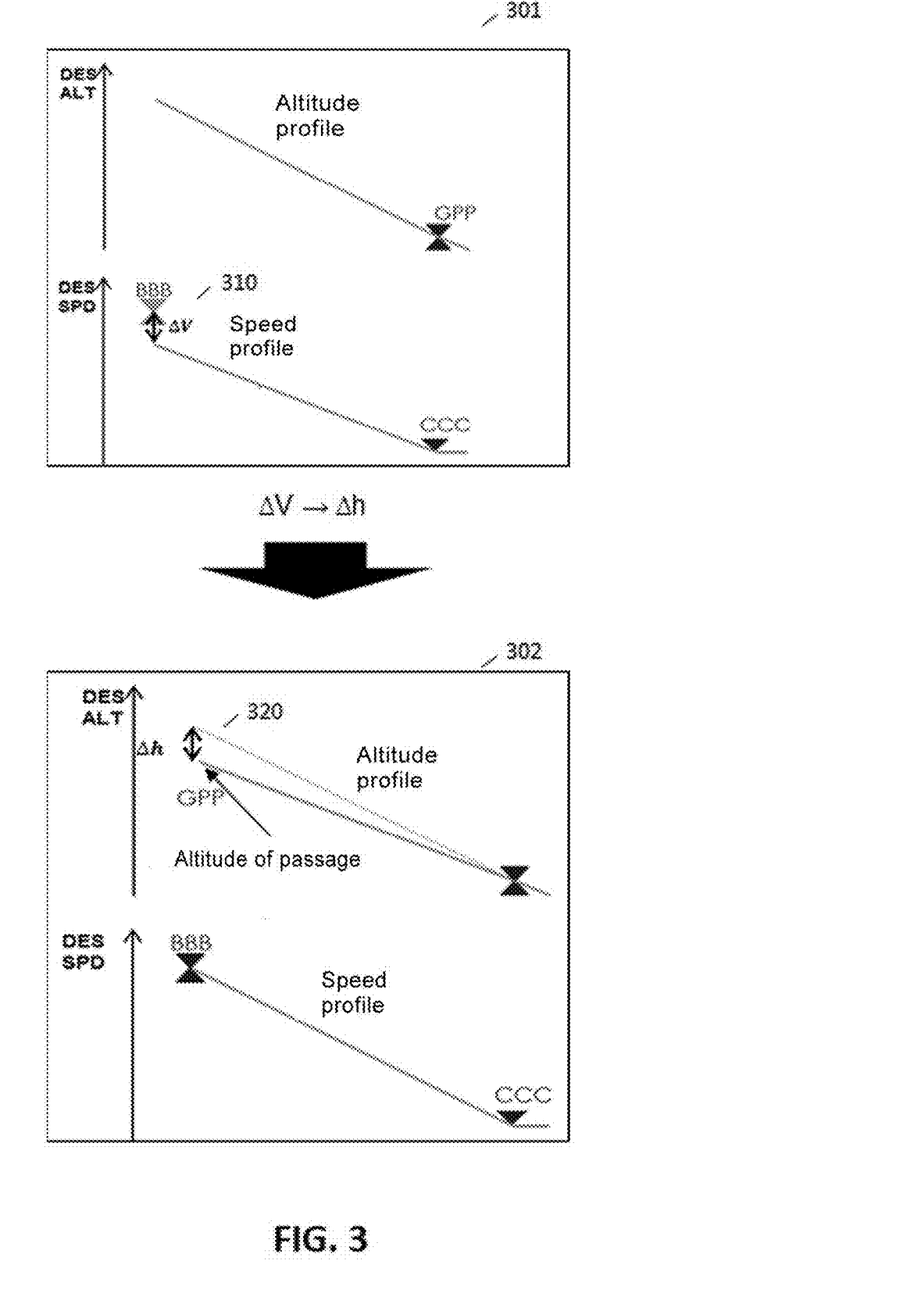
FIG. 3 schematically represents an example of determination of a vertical descent profile according to an embodiment of the method according to the invention.

FIG. 3 schematically represents an example of a result according to an embodiment of the method according to the invention.

In one embodiment of the invention, the method according to the invention can comprise a step of determining "optimized" (or "adjusted" or "adapted") altitudes of passage. The optimization can be performed according to one or more criteria. In one embodiment, an optimization criterion can comprise one or more speed constraints. For example, altitudes of passage can be optimized for speed constraints determined from F.M.S. data (which will then if necessary be expressed as speed constraints). In some embodiments, the method comprises one or more steps of manipulating these optimized altitudes of passage.

FIG. 3 shows a diagram of this "optimization" (or "adjustment" or "adaptation") between speed and altitude. A starting vertical profile 301 comprises speed constraints 310 according to the F.M.S. These speed constraints 310 have associated optimized altitudes of passage 320. The result thereof is a vertical profile 302 which can be displayed to the pilot and to which the airplane will be locked, thus allowing it to best satisfy all of these altitude and speed constraints.

In one embodiment, the method comprises a step of displaying, to the pilot or to the crew, this altitude profile that has also been optimized in light of different criteria comprising in particular compliance with the altitude and slope constraints, compliance with the speed constraint(s), optimization of the fuel consumption and the capacity to fly the reference profile according to the performance levels of the aircraft. The vertical profile determined according to one embodiment of the method according to the invention offers several advantages, in particular that of making it possible to generate fuel and time savings (with respect to a nominal strategy, with low implementation costs through maximizing the re-use of existing mechanisms) and that of making it possible to comply with the speed constraints during the descent phase.

The display devices can comprise or implement one or more sophisticated devices such as virtual reality headsets and/or augmented reality glasses (e.g. "head-mounted display", "wearable computer", "glasses" or a video headset) and/or projection (e.g. holographic) devices. A virtual reality headset worn by the pilot can be opaque or semi-transparent or have configurable transparency. The display can be "head up". The headset can comprise one or more computation and communication, projection, audio acquisition, video projection and/or acquisition devices (for example for the acquisition or the "scraping" of data accessible in analog fashion from the cockpit or piloting cabin of the aircraft). The cockpit of the aircraft can also comprise voice control devices. The embedded instrumentation can advantageously allow the pilot to view his or her flight plan or his or her trajectory in 3D. The pilot will for example be able to view (for example by graphic overlay of his or her real environment or immersively with a virtual reality device, forward or backward) one or more of the elements (measured or computed/simulated/anticipated) out of the descent profile, one or more altitude and/or speed constraints, one or more optimized altitudes of passage, etc.

In some embodiments, haptic feedback devices incorporated in the system for the implementation of the invention will be able to enrich the guidance/piloting (specific vibrations upon actually crossing an optimized altitude of passage or when the latter is missed, etc.).

Regarding the display, the information can be displayed in one or more virtual and/or augmented reality headsets. The information can therefore be entirely virtual (displayed in an individual headset), entirely real (for example projected onto the flat surfaces available in the real environment of the cockpit of the aircraft) or a combination of the two (partly a virtual display superimposed or merged with reality and partly a real display via projectors). The display can also be characterized by the application of predefined placement rules and display rules. For example, the human-machine interfaces (or the information) can be "distributed" (segmented into distinct portions, possibly partially redundant, then allocated) between the different virtual or real screens.

In one embodiment, to determine the vertical profile, the method according to the invention can be based on the predictions supplied by the F.M.S. A computation of trajectory (determined backward, i.e. in so-called backward mode) can in particular be applied, which makes it possible to iteratively establish the different optimized altitudes of passage associated with the different speed constraints until the last constraining speed constraint is reached.

A "backward" profile denotes the construction of a "reverse" (or "backward") descent profile, starting from the destination and returning to the cruising altitude. This profile can serve as reference vertical trajectory on which the airplane will be guided. On this descent profile, the airplane equations are integrated "forward", i.e. starting from the current airplane position and trying to conform as much as possible to the theoretical profile, that constitutes the flight predictions which are displayed in the cockpit to the pilot through altitude, distance to destination, speed, time and fuel consumption values. The construction of a "backward" profile amounts to an iterative method. It is necessary for the computation to converge and guarantee compliance with all the constraints while ensuring that the reference trajectory is flyable in light of the performance levels of the aircraft.

The integration of a "backward" profile can be done in different ways, generally according to an "FPA" mode or a so-called "OPEN IDLE" mode. In a so-called "FPA" (flight path angle) mode, the constraints in terms of descent slope are given. In a so-called "OPEN IDLE" mode, a check is carried out to ensure that all the altitude constraints are MADE (satisfied), and the position of the G.P.P. point is modified by replacing it with the first missed constraint if such exists.

Figure 4:
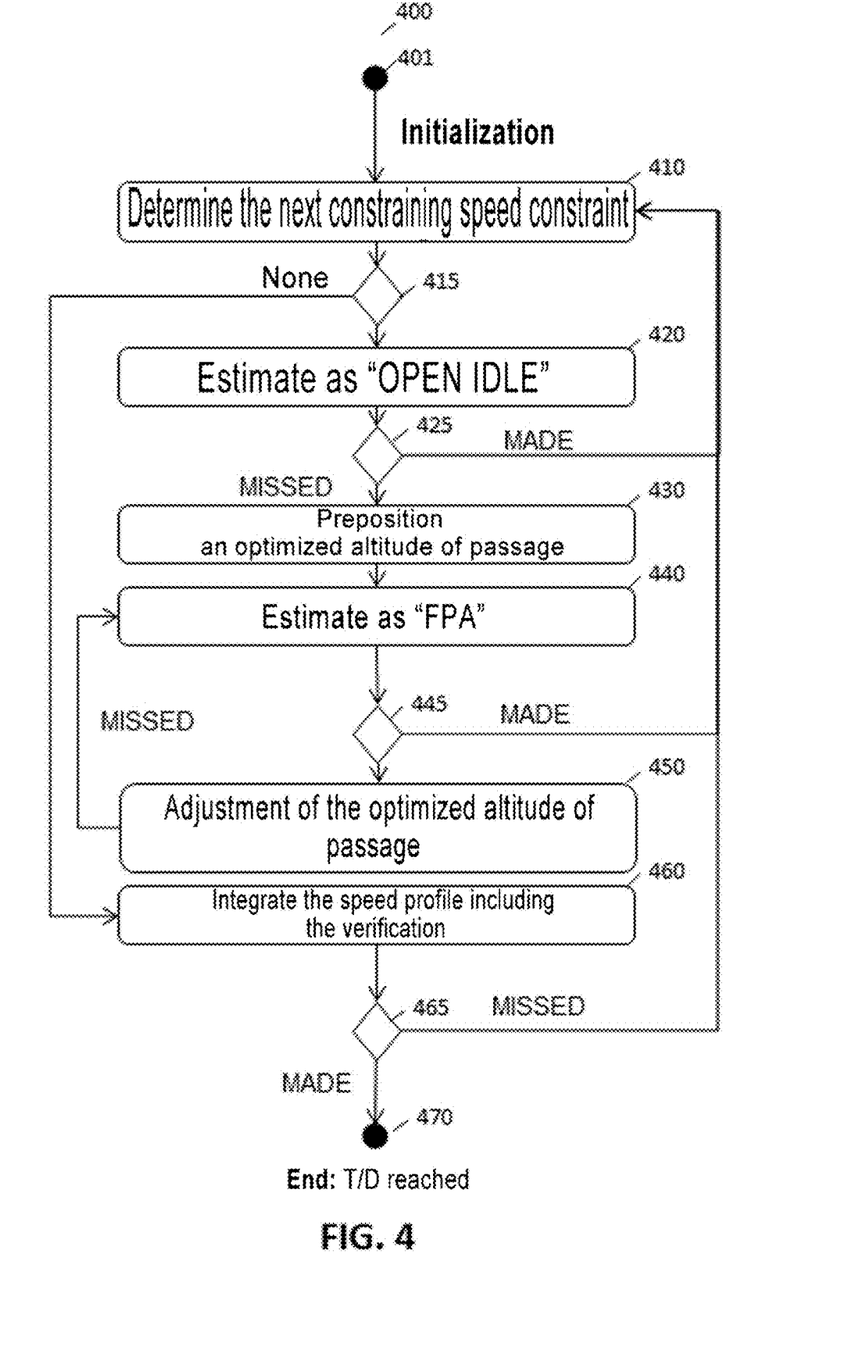
FIG. 4 illustrates examples of steps of the method according to an embodiment of the invention.

FIG. 4 illustrates examples of steps of the method according to an embodiment of the invention.

Different embodiments of the method are possible.

In one embodiment, the method 400 according to the invention comprises one or more of the steps.

In the step 401, the method is initialized. The initialization step corresponds for example to the input by the pilot (or the system) of a flight plan and/or the choice of an approach strategy (i.e. one or more predefined rules).

Figure 5:
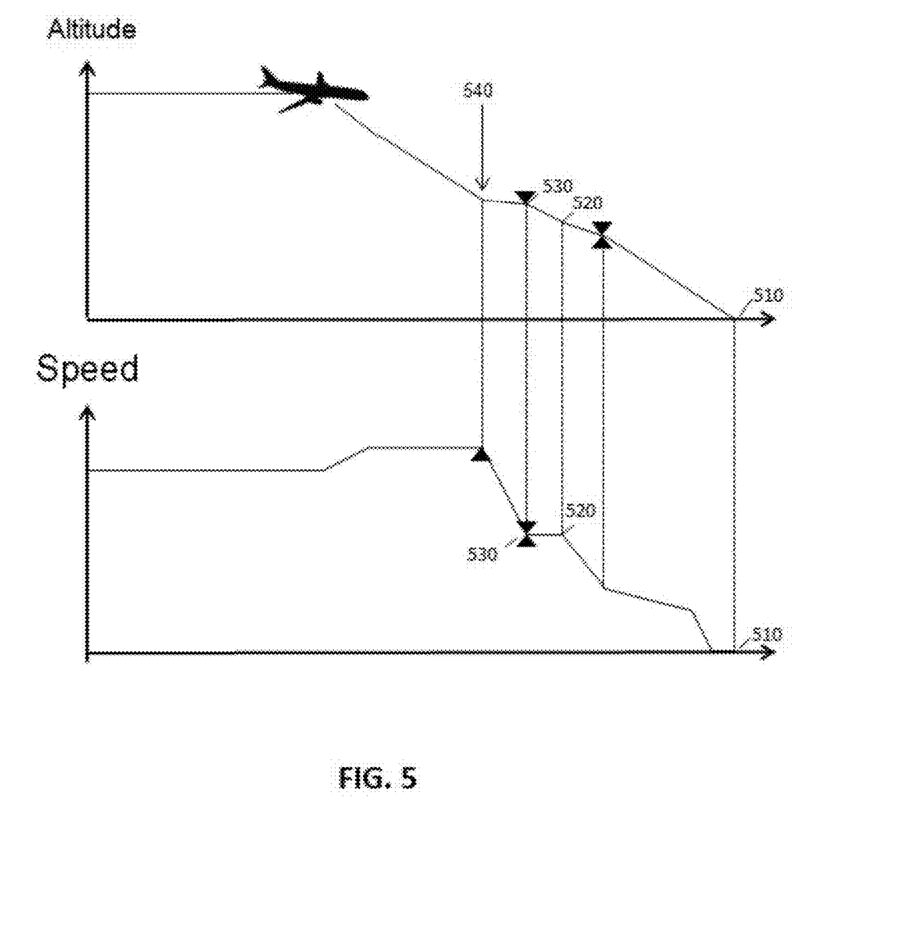
FIG. 5 illustrates an exemplary embodiment.

The speed and altitude profiles are determined in "backward" mode (i.e. by iterative computation from downstream to upstream, from the point of arrival 510 to the point of departure), to the point called DECEL point (deceleration to the final approach speed), by using the default approach strategy in the flight management system FMS or the strategy chosen by the pilot. Once this information is confirmed, the descent profile of the aircraft is "integrated" (i.e. assimilated, accepted, revised) until the characteristic flight plan point called the Geometrical Path Point (GPP) is rejoined, this point of the flight plan separating the so-called geometrical descent from the so-called IDLE descent.

In the step 410, the method comprises a step of determining one or more speed constraints, these constraints being constraining (or imperative, that is to say having to be complied with by the aircraft).

In one embodiment, this step 410 comprises one or more steps out of the steps of running through all the points of the flight plan ("waypoints") further away from the runway than the G.P.P. point (and/or from the current point) in order to find (all) the speed constraints (of descent type) which are both greater than the speed of the current point and which are of any constraint type (i.e. of "AT", "AT OR ABOVE", "AT OR BELOW" or possibly "WINDOW" type).

In one embodiment, the method comprises a step of establishing the list of all the "constraining" or "imperative" speed constraints, of descent type (during the descent phase), between the current point of the integration and the last point of the flight plan (the furthest away from the runway) in the "backward" direction.

In one embodiment, the method also comprises a step of selecting at least one speed constraint out of those listed previously, for which an optimized (or target or intermediate) altitude of passage will be determined. In one embodiment, the speed constraint selected is the first speed constraint encountered in the "backward" direction starting from the initial point and increasing the distance from the point of destination of the flight.

Thus, the speed and the position of the next speed constraint to be considered are determined (for example speed denoted $spd_{ctr}$ and position denoted $x_{spd_{ctr}}$).

In the step 415, a test is carried out relating to the selected speed constraint. If at least one speed constraint has been found, the method continues with the step 420. If no speed constraint has been selected, the method continues with the step 460.

In the step 420, the speed profile and the altitude profile is estimated in so-called "OPEN IDLE" mode. In one embodiment, this step consists in estimating, in "OPEN IDLE" mode, the variation of the speed profile (initially at the so-called G.P.P. point, then at the passage of the speed constraints thereafter) until a speed constraint is selected, by considering i the initial point of the computation and f the speed-constrained final point. The initial conditions of the estimation are therefore defined at the current point ($h_i$, $CAS_i$). A final altitude and speed are therefore estimated ($h_f$, $CAS_f$).

In the step 425, a test is carried out on the duly determined speed constraint. In particular, a determination can be made as to whether the speed constraint is complied with or not, possibly by including a margin $\Delta V$.

In one embodiment, if the constraint is of "AT OR ABOVE" type or of "WINDOW" type, and if the estimated speed is less than the minimum speed of the constraint accompanied by a margin $\Delta V$ ($CAS_f < spd_{ctr} - \Delta V$), then the constraint is declared "MISSED" and constraining. If the constraint is of "AT OR BELOW" or "WINDOW" type and if the estimated speed is greater than the maximum speed of the constraint accompanied by a margin $\Delta V$ ($CAS_f > spd_{ctr} + \Delta V$), then the constraint is declared "MISSED" and constraining. If the constraint is of "AT" type and if the estimated speed is different from the speed of the constraint accompanied by a margin $\Delta V$ ($CAS_f < spd_{ctr} - \Delta V$ or $CAS_f > spd_{ctr} + \Delta V$) then the constraint is declared "MISSED" and constraining. In the preceding three cases, the method continues with the step 430.

In the absence of the preceding situations, the constraint is declared "MADE" and non-constraining. In this case, the method continues iteratively with a return to the step 410, the intermediate constraint becoming the initial point.

In the step 430, the method comprises a step of determining the optimized altitude of passage to the speed constraint declared "MISSED", as a function of the estimated speed to be able to hold to the speed constraint.

To this end, the speed values are estimated as speed relative to the ground to apply an energy-related reasoning:

$$TAS_f = f(CAS_f, h_f) \rightarrow GS_f = \sqrt{TAS_f^2 - wind_Y^2} - wind_X$$

$$TAS_{ctr} = f(spd_{ctr}, h_f) \rightarrow GS_{ctr} = \sqrt{TAS_{ctr}^2 - wind_Y^2} - wind_X$$

$$\Delta V = GS_{ctr} - GS_f$$

Which makes it possible to obtain:

$$\Delta h_{(IDLE)} = -\frac{ES}{1-ES} * \frac{(2 \cdot GS_{ctr} * \Delta V + \Delta V^2)}{2g} \quad \text{(equation 1)}$$

The optimized altitude of passage to the speed constraint is given by:

$$h_{cstr} = \min(\max(h_i, h_{min}, h_f + \Delta h_{(IDLE)}), h_{max})$$

Consequently, the optimized altitude of passage is necessarily greater than or equal to that of the initial position (the "backward" profile being increasing and monotonic in altitude), and also complies with the altitude constraints such as i) an altitude constraint of "AT OR BELOW" type ($h_{max}$) or a higher limit of "WINDOW" type ($h_{max}$) for which the distance to the destination is greater than that of i; and ii) such as an altitude constraint of "AT OR ABOVE" type ($h_{min}$) or a lower limit WINDOW ($h_{min}$) between i and f. No altitude constraint of "AT" type can be encountered because the distance to the destination is greater than or equal to that of the GPP, which cannot be located closer to the runway than a constraint of "AT" type, by definition.

In the step 440, the method comprises a step of estimating the speed profile (in a so-called "FPA" mode). The descent slope constraints are known in aeronautics by the acronym "FPA", for Flight Path Angle. In one embodiment, this step consists in estimating the speed variation from the initial conditions to the speed constraint by taking account of the new altitude constraint (AT/AT OR BELOW).

The initial conditions of the estimation are defined at the current point ($h_i$, $CAS_i$). An altitude and a final speed are estimated ($h_{cstr}$, $CAS_f$).

In the step 445, the method comprises a step of performing a test on the duly determined speed constraint. If the constraint considered is "MISSED" and the number of iterations implemented by the method is less than a predefined number N (for example equal to five), then the method continues with the step 450. If the constraint is MADE, the method returns to the step 410.

In the step 450, the method comprises a step of adjusting the optimized altitude of passage to the speed constraint, in particular as a function of the previously estimated speed, in order to be able to satisfy the speed constraint. To this end, the speed values (estimated in speed relative to the ground) are transformed by means of an energy-related reasoning:

$$TAS_f = f(CAS_f, h_{cstr}) \rightarrow GS_f = \sqrt{TAS_f^2 - wind_Y^2} - wind_X$$

$$TAS_{ctr} = f(spd_{ctr}, h_{cstr}) \rightarrow GS_{ctr} = \sqrt{TAS_{ctr}^2 - wind_Y^2} - wind_X$$

$$\Delta V = GS_{ctr} - GS_{final}$$

Which makes it possible to obtain:

$$\Delta h_{(FPA)} = -\frac{1}{\cos(FPA)} * \frac{(2 \cdot GS_{ctr} * \Delta V + \Delta V^2)}{2g} \quad (2)$$

The optimized altitude of passage to the speed constraint is updated at an altitude:

$$h_{cstr} = \min(\max(h_i, h_{min}, h_{cstr} + \Delta h_{(FPA)}), h_{max})$$

Therefore, the optimized altitude of passage to the speed constraint is necessarily greater than or equal to the initial position, and also complies with the altitude constraints i) such as an altitude constraint of AT OR BELOW type ($h_{max}$) or upper limit WINDOW ($h_{max}$) for which the distance to the destination is greater than that of i; and ii) such as an altitude constraint of AT OR ABOVE type ($h_{min}$) or lower limit WINDOW ($h_{min}$) between i and f.

The steps 440, 445 and 450 can be reiterated. The value $h_{cstr}$ corresponding to the optimized altitude of passage to the speed constraint can be tested, and other optimized altitudes of passage to the other speed constraints can be determined, if necessary.

Optionally, the iterations can be counted (e.g. incrementing of a counter counting the number of iterations).

In the step 460, the duly determined descent profile is "integrated" after a verification step. This step consists in integrating "backward" the speed and altitude profile until the so-called T/D point is reached. The T/D point, Top of Descent, corresponds generally to the point at which the cruising altitude and speed are joined, which marks the termination of the integration computation performed "backward" of the descent profile by considering the optimized altitudes of passage (for example relative to the speed constraints). These speed constraints can moreover be taken into account whatever their types (a speed can therefore be saturated with the value of an "AT", "AT OR BELOW" constraint, or even with the high limit of a "WINDOW" if the latter has not been sequenced "backward").

In one embodiment, the holding to the altitude constraints is verified in the context of an integration in "OPEN IDLE" mode (verification that all the altitude constraints are satisfied, modification of the so-called G.P.P. point by replacing it with the first constraint missed "backward", therefore between the preceding G.P.P. and the cruising level, if it exists). An altitude constraint of "AT" type is considered to be held to if the integration leads to an altitude value equal to the constraint at the passage thereof; an altitude constraint of "AT OR BELOW" type is considered to be held to if the integration leads to an altitude value less than or equal to the constraint at the passage thereof; an altitude constraint of "AT OR ABOVE" type is considered to be held to if the integration leads to an altitude value greater than or equal to the constraint at the passage thereof; an altitude constraint of "WINDOW" type is considered to be held to if the integration leads to an altitude value lying between the lower and upper limits of the constraint at the passage thereof. This verification of the holding to (satisfaction of) the altitude constraints culminates in a return to the step 410 with a new G.P.P. point as starting point, which corresponds to the unsatisfied altitude constraint.

The list of the optimized altitudes of passage to the speed constraints can then be deleted and the steps of the method can be reiterated, by restarting from the step 410 with, as initialization point, the new G.P.P.

Different variant embodiments are described hereinbelow.

According to a variant embodiment, the method comprises one or more steps of determining or selecting and displaying one or more optimized altitudes of passage, not present in the procedure, but which are associated for example with the holding to/satisfaction of one or more speed constraints. This advantageous embodiment makes it possible to improve the understanding of the crew. The ND, VD and MFD screens can be used.

According to a variant embodiment, the method comprises one or more steps of presenting the result of the computation to the pilot, by presenting to him or her for example an indication of holding to the speed constraint (e.g. of MISSED or MADE type) by means of the screens present in the cockpit. This indication will for example be able to consist of an amber color, indicating an element of the flight plan missed such as an altitude constraint for example and/or a dedicated text message, for example such as "SPD ERROR AT WAYPOINT". Other return or feedback methods can be implemented (haptic, audio, visual, etc. feedback).

According to a variant embodiment, the method comprises one or more steps of taking into account the airbrakes of the aircraft, thus allowing for a better deceleration of the airplane when the position of an altitude constraint is not sufficient, everything being able to be able to be done from reaching a level, or on a parameterizable slope threshold, for example at one degree less. An implementation can be performed in a discretized manner (e.g. with 50% of airbrakes) or continuously (e.g. through an estimation of the percentage of airbrakes required to retain the IDLE thrust).

According to a variant embodiment, the method comprises one or more steps of displaying or presenting to the pilot the hypothesis of use of the airbrakes, for example by graphically highlighting on the screen one or more segments concerned and/or by displaying the percentage of airbrakes used.

According to a variant embodiment, the method comprises one or more steps of communicating to the automated system, if necessary, a request to extend or retract the airbrakes according to the percentage of airbrakes used.

FIG. 5 illustrates an exemplary embodiment of the invention.

In the example, by reasoning from the runway in "backward" mode (from downstream to upstream, from the point of arrival 510 to the point of departure), once the approach phase is ended, when the point D 520 is reached, a constant speed is maintained initially to satisfy the AT speed constraint, associated with the last constraining altitude constraint, here an "AT OR BELOW" which represents the G.P.P. 530.

The steps of the method according to the invention are then implemented to define the optimized altitude of passage 540 which makes it possible to satisfy the speed constraint of "AT OR ABOVE" type.

In one embodiment, a method is disclosed for computing a speed profile of an aircraft in so-called "IDLE" descent to a speed constraint of descent type including: a) a "backward" estimation computation making it possible to assess the speed of the aircraft reached at a point of the trajectory from another point situated closer to the destination; b) an optimized altitude of passage to the speed constraint resulting from a transfer between potential and kinetic energy; c) a vertical descent profile (altitude/speed) computation based on the optimized altitude or altitudes of passage associated with the speed constraints and on the conventional altitude constraints, making it possible to minimize the error on the speed constraints of descent type according to the performance levels of the aircraft while minimizing the fuel consumption; d) an assessment of the capacity of the aircraft to hold to one or more speed constraints of descent type based on the vertical profile computation.

The present invention can be implemented from hardware and/or software elements. It can be available as a computer program product on a computer-readable medium. The medium can be electronic, magnetic, optical or electromagnetic.

The device implementing one or more of the steps of the method can use one or more dedicated electronic circuits or a general-purpose circuit. The technique of the invention can be implemented on a reprogrammable computation machine (a processor or a microcontroller for example) running a program comprising a sequence of instructions, or on a dedicated computation machine (for example a set of logic gates such as an FPGA or an ASIC, or any other hardware module). A dedicated circuit in particular can speed up the performance levels in terms of access and execution of the avionics services. As an example of hardware architecture suitable for implementing the invention, a device can comprise a communication bus to which are linked a central processing unit or microprocessor (CPU, "Central Processing Unit"), which processor can be "multicore" or "many-core"; a read-only memory (ROM) being able to contain the programs necessary for the implementation of the invention; a random-access memory or cache memory (RAM, "Random Access Memory") including registers suitable for storing variables and parameters created and modified during the execution of the abovementioned programs; and a communication or I/O (input/output) interface suitable for transmitting and receiving data.

In one embodiment, the flight management system ("open") is composed of a digital avionics core ("functional core") and of a list of characterized avionics services, that is to say services whose structure and functions are predefined.

In one embodiment, the vertical optimization method can be implemented on an application executed on a computer tablet (for example of EFB Electronic Flight Bag type). Therefore, the result of the optimized trajectory, including the optimized altitudes of passage, will be able to be communicated to an avionics core (real or simplified/simulated/emulated, on request or not, etc.). After authorization by the crew, the avionics core will be able to then validate or modify this trajectory, in order to use it as reference for the guidance of the aircraft.

In one embodiment, the method uses an exposition of the functional avionics core of the FMS through one or more programming interfaces (APIs) accessible from one or more servers.

A programming interface (API, for "Application Programming Interface") is a standardized set of classes, of methods, of functions, of data types and of constants which serves as front-end through which a piece of software offers services to other software. An API can be "private", that is to say intended for computer development use performed internally. An API can be "open" or "public" ("open API"): the specifications of the interface can be published, i.e. accessible to the public and in particular to third-party developers.

According to the embodiments, the documentation or the description of the programming interfaces is more or less comprehensive, in a way specific to the avionics sector. In other words, in some embodiments, the description of the avionics services is comprehensive and exhaustive. In other embodiments, the description or the documentation is only partial (some commands not published or encrypted on purpose make it possible to obtain certain information from the FMS, for example particularly critical information). In one embodiment, the description of the avionics services is accessible on demand. In one embodiment, the complete description of an avionics service is encrypted, that is to say that the existence of documentation is apparent but that the access to its content requires a previously shared secret. In one embodiment, the description and/or the existence of an avionics service is concealed (like steganography).

Regarding the access to the programming interfaces of the avionics services, the permissions or restrictions on access to the different APIs can be specific. The access to a given avionics service can be configurable, for example in terms of tariff, of quantity of calls (volumes), of quality of service (e.g. priorities). In one embodiment, access can be "free", unlimited in volume and without access restrictions. In other situations, the access to certain functions of the FMS can be limited (quantity, quality) by access restrictions (access control, keys, encryption, absolute and/or relative priorities). Some embodiments of the invention can combine the use of APIs of "public" type (e.g. published) with the use of APIs of "private" type (e.g. certain advantages or privileges can be reserved for internal development or for selected aeronautics partners). The life cycle of an API can give rise to various developments (e.g. the stability of certain APIs can be guaranteed whereas others will be able to be depreciated "deprecated API").

The invention claimed is:

1. A method implemented by computer for determining a vertical descent profile of an aircraft, the method comprising:
receiving one or more speed constraints and/or one or more altitude constraints;
determining an altitude profile comprising a succession of altitude-related segments and a speed profile comprising a succession of speed-related segments;
determining one or more deviations between the altitude profile and said one or more altitude constraints and/or between the speed profile and said one or more speed constraints;
determining one or more optimized altitudes of passage along said altitude profile, an optimized altitude of passage $h_{cstr}$ at a final point of a segment of the speed profile being calculated by:

$$h_{cstr} = \min(\max(h_i, h_{min}, h_f + \Delta h_{(IDLE)}), h_{max})$$

wherein:
$h_i$ is an altitude of the aircraft at an initial point of the segment;
$h_f$ is an estimated altitude of the aircraft at the final point of the segment with a speed constraint;
$\Delta h(IDLE)$ is an altitude difference calculated as:

$$GS_f = \sqrt{TAS_f^2 - wind_Y^2 - wind_X}$$

$$GS_{ctr} = \sqrt{TAS_{ctr}^2 - wind_Y^2 - wind_X}$$

$$\Delta V = GS_{ctr} - GS_f$$

$$\Delta h_{(IDLE)} = -\frac{ES}{1-ES} * \frac{(2.GS_{ctr} * \Delta V + \Delta V^2)}{2g};$$

$h_{min}$ is an altitude constraint of "AT OR ABOVE" type or a lower limit of "WINDOW" type in the altitude profile at the final point of the segment;
$h_{max}$ is an altitude constraint of "AT OR BELOW" type or a higher limit of "WINDOW" type in the altitude profile at the final point of the segment;
$TAS_f^2$ is an estimated true air speed (TAS) at the final point of the segment;
$wind_Y^2$ is a y component of a wind speed;
$wind_X$ is an x component of the wind speed;
$TAS_{ctr}^2$ is a constrained TAS at the final point of the segment;
ES is an energy sharing (ES) ratio, corresponding to a ratio between a kinetic energy and a total energy of the aircraft; and
g is a gravitational constant; and
iteratively determining an optimized vertical descent profile, comprising said one or more optimized altitudes of passage, by performing an energy conversion of kinetic energy into potential energy to convert an IDLE vertical descent profile into a geometrical profile with fixed slope approximating an IDLE reduced thrust, by modifying the optimized altitude of passage $h_{cstr}$ by calculating:

$$\Delta h_{(FPA)} = -\frac{1}{\cos(FPA)} * \frac{(2.GS_{ctr} * \Delta V + \Delta V^2)}{2g}$$

$$h_{cstr} = \min(\max(h_i, h_{min}, h_{cstr}, \Delta h_{(FPA)}), h_{max})$$

wherein FPA is a Flight Path Angle of the segment;
wherein the optimized vertical descent profile (i) is of OPEN IDLE, flight path angle (FPA), or vertical speed (VS) type, (ii) comprises one or more optimized altitudes, and (iii) is determined backward,
wherein the IDLE vertical descent profile includes a plurality of variably sloped segments, and
wherein the energy conversion satisfies one of said one or more speed constraints that is of AT or AT OR ABOVE type.

2. The method as claimed in claim 1, wherein the optimized vertical descent profile determined backward is determined from downstream to upstream, or from a point of arrival or of destination of a flight plan of the aircraft to a current flight plan point or a point associated with a flight plan point associated with an optimized altitude.

3. The method as claimed in claim 1, further comprising: intending to actuate airbrakes of the aircraft to reduce a speed of the aircraft by maintaining a reduced engine thrust of IDLE type.

4. The method as claimed in claim 1, wherein a number of the iterations is configurable.

5. The method as claimed in claim 1, further comprising: disregarding and/or selecting one or more constraints, of the speed constraint and/or of the altitude constraint, out of the constraints received, as a function of priorities associated with said received constraints.

6. The method as claimed in claim 1, further comprising: displaying at least one optimized altitude of passage.

7. A non-transitory, computer-readable medium, comprising instructions executable by a computer to perform a method for determining a vertical descent profile of an aircraft, the method comprising:
receiving one or more speed constraints and/or one or more altitude constraints;
determining an altitude profile comprising a succession of altitude-related segments and a speed profile comprising a succession of speed-related segments;
determining one or more deviations between the altitude profile and said one or more altitude constraints and/or between the speed profile and said one or more speed constraints;
determining one or more optimized altitudes of passage along said altitude profile, an optimized altitude of passage $h_{cstr}$ at a final point of a segment of the speed profile being calculated by:

$$h_{cstr} = \min(\max(h_i, h_{min}, h_f + \Delta h_{(IDLE)}), h_{max})$$

wherein:
$h_i$ is an altitude of the aircraft at an initial point of the segment;
$h_f$ is an estimated altitude of the aircraft at the final point of the segment with a speed constraint;
$\Delta h(IDLE)$ is an altitude difference calculated as:

$$GS_f = \sqrt{TAS_f^2 - wind_Y^2 - wind_X}$$

$$GS_{ctr} = \frac{\sqrt{TAS_{ctr}^2 - wind_Y^2 - wind_X}}{\Delta V = GS_{ctr} - GS_f}$$

$$\Delta h_{(IDLE)} = -\frac{ES}{1-ES} * \frac{(2.GS_{ctr}*\Delta V + \Delta V^2)}{2g};$$

$h_{min}$ is an altitude constraint of "AT OR ABOVE" type or a lower limit of "WINDOW" type in the altitude profile at the final point of the segment;
$h_{max}$ is an altitude constraint of "AT OR BELOW" type or a higher limit of "WINDOW" type in the altitude profile at the final point of the segment;
$TAS_f^2$ is an estimated TAS at the final point of the segment;
$wind_Y^2$ is a y component of a wind speed;
$wind_X$ is an x component of the wind speed;
$TAS_{ctr}^2$ is a constrained TAS at the final point of the segment;
ES is a ratio between a kinetic energy and a total energy of the aircraft; and
g is a gravitational constant; and
iteratively determining an optimized vertical descent profile, comprising said one or more optimized altitudes of passage, by performing an energy conversion of kinetic energy into potential energy to convert an IDLE vertical descent profile into a geometrical profile with fixed slope approximating the IDLE reduced thrust, wherein the optimized vertical descent profile (i) is of OPEN IDLE, FPA, or VS type, (ii) comprises one or more optimized altitudes, and (iii) is determined backward, by modifying the optimized altitude of passage $h_{cstr}$ by calculating:

$$\Delta h_{(FPA)} = -\frac{1}{\cos(FPA)} * \frac{(2.GS_{ctr}*\Delta V + \Delta V^2)}{2g}$$

$h_{cstr}=\min(\max(h_i,h_{min},h_{cstr}+\Delta h_{(FPA)}),h_{max})$ wherein FPA is a Flight Path Angle of the segment;
wherein the IDLE vertical descent profile includes a plurality of variably sloped segments, and
wherein the energy conversion satisfies one of said one or more speed constraints that is of AT or AT OR ABOVE type.

8. A system for determining a vertical descent profile of an aircraft, comprising:
an avionics sequencer configured to iteratively determine a vertical descent profile;
non-transitory memory; and
a processor coupled to the memory storing instructions that, when executed, cause the processor to perform:
receiving one or more speed constraints and/or one or more altitude constraints;
determining an altitude profile comprising a succession of altitude-related segments and a speed profile comprising a succession of speed-related segments;
determining one or more deviations between the altitude profile and said one or more altitude constraints and/or between the speed profile and said one or more speed constraints;
determining one or more optimized altitudes of passage along said altitude profile, an optimized altitude of passage $h_{cstr}$ at a final point of a segment of the speed profile being calculated by:

$h_{cstr}=\min(\max(h_i,h_{min},h_f+\Delta h_{(IDLE)}),h_{max})$ wherein:
$h_i$ is an altitude of the aircraft at an initial point of the segment;
$h_f$ is an estimated altitude of the aircraft at the final point of the segment with a speed constraint;
$\Delta h(IDLE)$ is an altitude difference calculated as:

$$GS_f = \sqrt{TAS_f^2 - wind_Y^2 - wind_X}$$

$$GS_{ctr} = \frac{\sqrt{TAS_{ctr}^2 - wind_Y^2 - wind_X}}{\Delta V = GS_{ctr} - GS_f}$$

$$\Delta h_{(IDLE)} = -\frac{ES}{1-ES} * \frac{(2.GS_{ctr}*\Delta V + \Delta V^2)}{2g};$$

$h_{min}$ is an altitude constraint of "AT OR ABOVE" type or a lower limit of "WINDOW" type in the altitude profile at the final point of the segment;
$h_{max}$ is an altitude constraint of "AT OR BELOW" type or a higher limit of "WINDOW" type in the altitude profile at the final point of the segment;
$TAS_f^2$ is an estimated TAS at the final point of the segment;
$wind_Y^2$ is a y component of a wind speed;
$wind_X$ is an x component of the wind speed;
$TAS_{ctr}^2$ is a constrained TAS at the final point of the segment;
ES is a ratio between a kinetic energy and a total energy of the aircraft; and
g is a gravitational constant; and
iteratively determining an optimized vertical descent profile, comprising said one or more optimized altitudes of passage, by performing an energy conversion of kinetic energy into potential energy to convert an IDLE vertical descent profile into a geometrical profile with fixed slope approximating the IDLE reduced thrust, wherein the optimized vertical descent profile (i) is of OPEN IDLE, FPA, or VS type, (ii) comprises one or more optimized altitudes, and (iii) is determined backward, by modifying the optimized altitude of passage $h_{cstr}$ by calculating:

$$\Delta h_{(FPA)} = -\frac{1}{\cos(FPA)} * \frac{(2.GS_{ctr}*\Delta V + \Delta V^2)}{2g}$$

$h_{cstr}=\min(\max(h_i,h_{min},h_{cstr}+\Delta h_{(FPA)}),h_{max})$ wherein FPA is a Flight Path Angle of the segment;
wherein the IDLE vertical descent profile includes a plurality of variably sloped segments, and
wherein the energy conversion satisfies one of said one or more speed constraints that is of AT or AT OR ABOVE type.

9. The system as claimed in claim 8, comprising a flight management system (FMS) of avionics type FMS and/or an electronic flight bag (EFB).

* * * * *